INVENTOR
WILLIAM A. THOMPSON
BY
ATTORNEY

United States Patent Office 3,566,262
Patented Feb. 23, 1971

3,566,262
MOLECULAR SPECTROMETER USING POINT TUNNELING
William A. Thompson, Hartsdale, N.Y., assignor to International Business Machines Corporation, Armonk, N.Y., a corporation of New York
Filed Mar. 18, 1968, Ser. No. 713,692
Int. Cl. G01r 27/02
U.S. Cl. 324—65                3 Claims

ABSTRACT OF THE DISCLOSURE

A molecular spectrometer or spectroscope is described based on the interaction of tunneling electrons with energy states of molecules included at a metal-semiconductor interface. Molecular rotational levels of sample substances are observed by means of a simple bulk tunneling device wherein the Schottky barrier layer of a semiconductor is employed as part of a tunneling diode comprising a semiconductor probe contacting a metal electrode. A particularly practical barrier effect is created by doping a semiconductor so that it has a low conductance at its surface so as to provide a high number of tunneling electrons at low voltages. Because the barrier is created to be an intrinsic property of the probe, the ultimate spectrometer unit using such probe has a long life, and is capable of being used indefinitely in molecular spectrometry devices relying upon tunneling of electrons through a barrier layer.

BACKGROUND OF THE INVENTION

Spectroscopy is the science of identifying substances by the spectra emitted or absorbed by such substances under controlled conditions of temperature, pressure, etc. At present, there are many known ways of locating molecular levels in the frequency range from $10^9$ to $5 \times 10^{13}$ cycles per second. However, in order to locate such molecular levels, in such frequency range, one requires several microwave sources and infrared spectrometers. Such devices operate on the principle of photon absorption, and in the frequencies of interest noted above, one often has difficulties obtaining suitable light sources, windows and detectors. Furthermore, most of the equipment is cumbersome and expensive.

The present invention relies on the conductance of a tunneling junction, i.e., an electrode—a barrier layer—an electrode junction, with increasing bias voltages applied across the junction. Tunneling electrons interact with energy states of molecules at a metal-semiconductor interface. The number of electrons passing through the barrier layer changes for certain voltages applied across the barrier layer. The latter voltages correspond to the energy levels of the molecules contained in the junction, where $\sqrt{}=eV/h$. Since the charge on the electron $e$ and Planck's constant $h$ are constant, frequency $\sqrt{}$ varies as the voltage V.

DESCRIPTION OF THE PRIOR ART

In a paper published by R. C. Jaklevic and J. Lambe, entitled "Molecular Vibration Spectra by Electron Tunneling" in the Physical Review Letters of Nov. 28, 1966, vol. 17, No. 22, pp. 1139, 1140, the authors discuss a spectrometer operating on the principle of electron tunneling rather than photon absorption. Jaklevic and Lambe constructed a three layered junction comprising aluminum, aluminum-oxide, and lead. The junctions were made in an oil-free ultrahigh-vacuum ($\sim 10^{-9}$ torr) system, with no air being allowed into the vacuum chamber until all layers were completed.

At first a 2000 A. layer of aluminum was deposited on a suitable substrate, such film being oxidized to approximately 30 A. As soon as oxidation of the aluminum was completed, the oxidized layer was exposed to the vapor of an organic material, i.e., acetic acid ($CH_3COOH$) or propionic acid ($CH_3(CH_2)COOH$). In effect, the organic material was incorporated into the 30 A. thick aluminum-oxide layer. A lead overlay $\sim 1\mu$ thick was deposited onto the aluminum-oxide layer to complete the junction.

Measurements were made with the junction maintained in a liquid-helium Dewar so that the temperatures ranged from 0.9° K to 300° K. Changing voltages were applied to the lead film and changing tunneling currents I from the lead to the aluminum through the aluminum-oxide layer were measured. Recorder traces of a plot of $d^2I/dV^2$ versus V depicted peak voltages that represented an increase of conductance of the Al-Al oxide Pb junction due to the interaction of tunneling current and the organic vapor molecules imbedded or impregnated in the barrier layer.

In obtaining molecular vibration spectra by electron tunneling, Jaklevic et al. were limited to a very elaborate technique for obtaining their barrier layer as well as their sample to be analyzed.

In the above noted representative prior art, the oxide layer serves as a matrix or carrier for the substance whose spectrum is sought. Thus, such as spectrometer is limited to a single material and, once the spectrum is obtained, a new junction with a new substance must be manufactured.

SUMMARY OF THE INVENTION

The present invention, in one of its preferred embodiments, employs a semiconductor electrode, in the shape of a pointed probe, that is heavily doped, i.e., $2 \times 10^{19}$ carriers/cc. Interposed between the semiconductor electrode and a metal electrode is a film of a substance whose energy levels are to be studied. The semiconductor probe that makes contact with the metal electrode through the film under study has a continuously increasing potential applied to its starting at 0 volts, with an A.C. modulating signal superimposed on the D.C. voltage level. The inelastic electron-molecule interaction leads to small conductance increases at voltages corresponding to molecular levels. The increased conductance is measured by sensing increased tunneling current appearing at the metal electrode. The semiconductor probe has a built-in Schottky barrier, the depth of which is proportional to the amount of doping. Such doping effectually creates a Schottky barrier at the surface of the bulk material of the semiconductor, or at each newly created surface of the probe. Consequently, the barrier properties are practically independent of probe damage. The practice of the invention, however, as a molecular spectrometer is not restricted to a doped semiconductor electrode. Other embodiments for supplying a barrier to tunneling electrons will be described hereinafter as well as their modes of operation for achieving the benefits of my molecular spectrometer.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 1A:
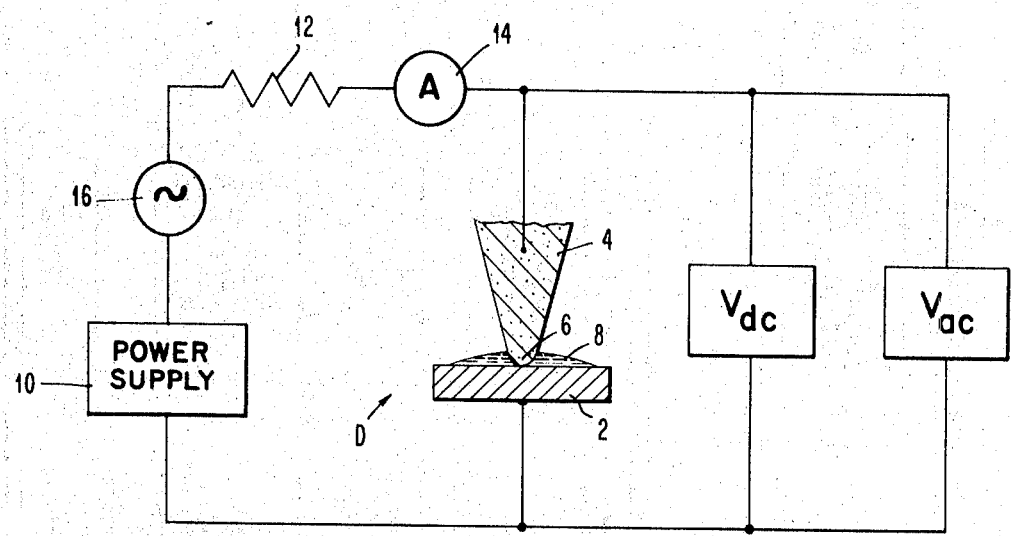
FIG. 1a is a preferred embodiment of my molecular spectrometer.

In FIG. 1a, element 2 is a substrate of metal which forms an electrode. A semiconductor counterelectrode 4 was cut from a single crystal of p-type GaAs, the latter being doped with zinc in the amount of $2 \times 10^{19}$ carriers/cc. The semiconductor is particularly useful because its barrier height is surface state dominated, so that the barrier properties are relatively insensitive to the metal electrode 2 with which it is in contact. The heavy doping level, meanwhile, produces a very thin barrier layer, whose width is ~50 A., so that relatively high tunneling currents can be achieved. The GaAs electrode 4 has its surface that contacts the electrode 2 hemispherically shaped so that the tip 6 of the electrode has a radius of about 0.2 mm. The tip 6 was chemically etched with a suitable acid, i.e., sulphuric-hydrogen peroxide mixture, to remove impurities.

A sample substance to be studied was laid down as a film 8 onto metal electrode 2. When the substance being studied was ethyl chloride ($CH_3CH_2Cl$) or hydrogen chloride (HCL), each of the latter was laid down as a liquid film. Where desired, the sample material could be a solid or semisolid layer interposed between the two electrodes 2 and 4. A source of variable D.C. voltage, such as that produced by power supply 10 and resistor 12, is applied to electrodes 2 and 4. Voltage source 16 supplies an A.C. source having a frequency of 5 kilocycles. Current readings are taken by placing an ammeter 14 across electrodes 2 and 4 as shown. The D.C. component $Vdc$ as well as the A.C. component $Vac$ was measured across the "diode" D.

Figure 1B:
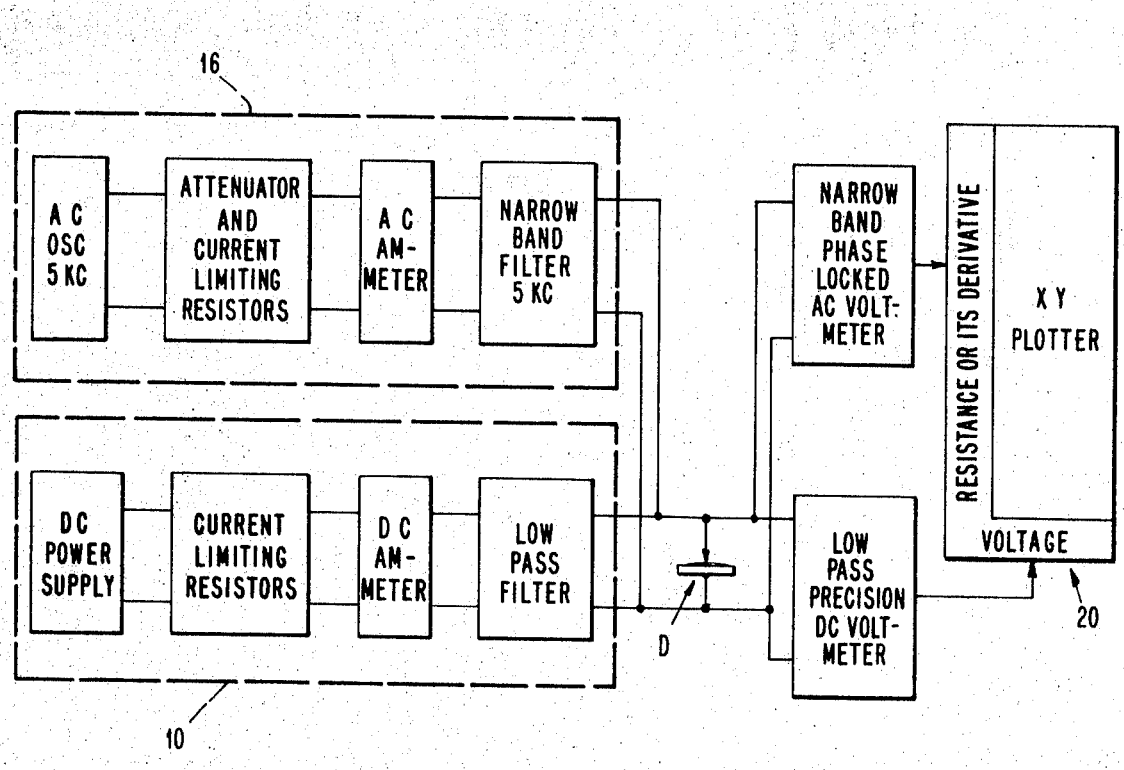
FIG. 1b is an actual system for implementing the preferred embodiment.

An actual circuit for obtaining a molecular spectroscopic analysis of HCl is shown in FIG. 1b. The D.C. power supply chosen for carrying out the invention was a Hewlet Packard (Model 6828A) unit with a motor driven potentiometer in a programming circuit for gradually changing the voltage of such supply 0 to 20 volts. Boxes labelled "current limiting resistors," "DC ammeter" and "Low Pass Filter" are conventional equipment for controlling voltages reaching the diode D. For example, such curent limiting resistors would vary between 100Ω to 100 MΩ and the low pass filter would pass a band of frequencies between 0 to 100 c.p.s.

The source of A.C. voltage 16 comprised a 5 kc. oscillator (Hewlet Packard Model 200 ABR) in series with an A.C. attenuator and a current-limiting resistor that varied between 10 KΩ and 10 MΩ and a narrow band filter for passing current at 5 kc. As the D.C. supply varies the current to diode D, an A.C. signal is simultaneously supplied ot the same diode. The D.C. component of the output voltage across diode D is passed through a D.C. voltmeter (Kiethley Model 661 Guarded Differential Voltmeter) and the A.C. component is passed through a narrow band phase locked A.C. voltmeter (EMC Model RJB Lock-in Amplifier). The simultaneous outputs of the two voltmeters are plotted on x–y plotter 20.

Figure 2:
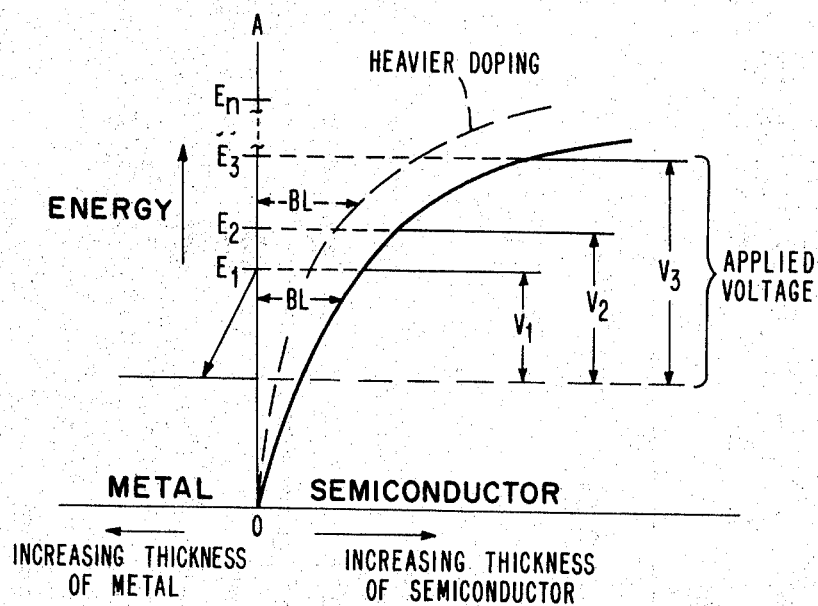
FIG. 2 is an energy diagram for aiding in an understanding of the theory of operation of the invention.

FIG. 2 is a simplified energy diagram relevant to the operation of the device of FIG. 1. When a metal is placed in contact with a semiconductor, a barrier layer BL exists at the interface of the metal and semiconductor. A substance whose molecular energy levels $E_1, E_2 \ldots E_n$ are to be studied is located at this interface. The width of the barrier layer BL affects the number of electrons that can tunnel from the semiconductor to the metal; the narrower that width, the higher will be the density of electrons tunneling to the metal. The higher the barrier height OA, the greater is the energy range (more molecular energy levels that can interact with tunneling electrons) that can be studied. However, as the barrier height increases, the width of the barrier layer BL also increases, leading to a reduction in the number of tunneling electrons that can be measured. In order to obtain the benefits of increased barrier height OA without a consequent increase in barrier width BL, the semiconductor is doped. The doping has the effect of diminishing the barrier width BL. As a conseqence, doping of the semiconductor probe 4 in FIG. 1 increases the energy range that can be studied.

Figure 3:
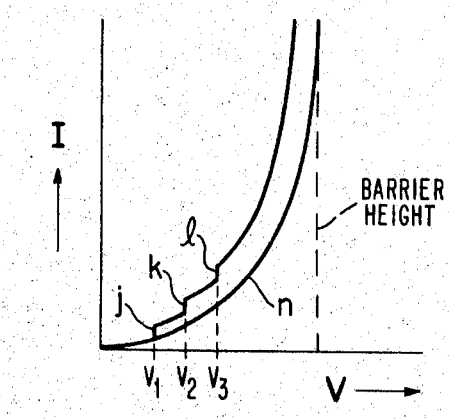
FIG. 3 is a plot of tunneling current I versus voltage (V) for the spectrometer of FIG. 1.

In the practice of the invention, changes in D.C. voltage V results in exciting the substance 8 to different energy states $E_1, E_2, E_3$, etc. The probe 6 provides tunneling electrons that can interact with the excited molecules of the substance 8 at a particular level. When $E_1 = eV_1$, there is an increased absorption by the material under test of the tunneling electrons. At the distinct energy level $E_1$, a small increase of conductance takes place. This increase in conductance is shown by line $j$ in the normal I–V plot shown in FIG. 3, where line $n$ represents such normal plot. Likewise, increased conductance takes place when tunneling electrons interact with a molecular level of the substance under test corresponding to voltage $V_2$. Such change in conductance is represented by line $k$ of FIG. 3. Line 1 corresponds to a change in conductance at $V_3$, the latter voltage corresponding to another discrete energy level of the substance being studied.

Figure 4:
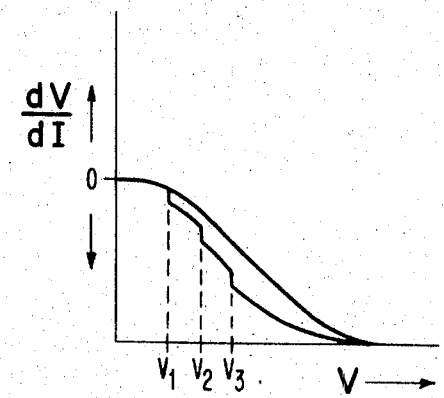
FIG. 4 is a plot of $dV/dt$ versus V.
Figure 5:
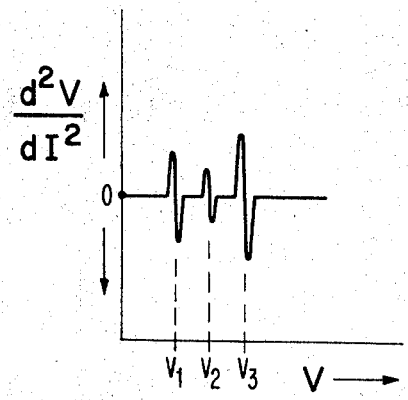
FIG. 5 is a plot of $d^2V/dt^2$ versus V.

In practice, the above noted increases in conductance at discrete molecular levels are very small. In order to accentuate these small changes, electronic equipment is used to plot either $dV/dI$ as a function of V as shown in FIG. 4, or $d^2V/dI^2$ as a function of V as shown in FIG. 5. A plot such as shown in FIG. 5 would be a preferred pictorial plot of an inelastic electron-molecule interaction between tunneling electrons and a sample substance at voltages corresponding to molecular levels.

Figure 6:
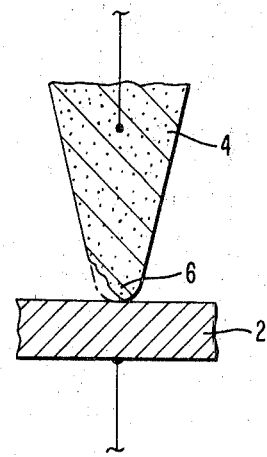
FIG. 6 is a showing of a damaged probe, still useable with the spectrometer forming the invention.

The advantages of using a doped semiconductor such as GaAs as a probe can be illustrated in FIG. 6. The doped semiconductor has its own built-in barrier to electron flow and such characteristic persists throughout the semiconductor probe 4. Thus, even if the probe tip 6 should chip or break away, as shown by the dotted line in FIG. 6, the remaining portion of the probe tip 6 still presents a barrier width of approximately 50 A. Thus each fresh surface of the probe 4 creates a Schottky barrier, allowing the probe to be used indefinitely in the molecular spectroscope unit shown and described herein.

It is to be understood that other semiconductor probes can be substituted for the GaAs probe used in the practice of my invention. Such substitutable semiconductors are set out in an article entitled "Fermi Level Position at the Metal-Semiconductor Interface" by Mead and Spitzer appearing in Physical Review Letters, vol. 10, No. 11, June 1, 1963. Representative semiconductors are CdS, GaSb, InSb, InP, InAs, SiC or n-type or p-type germanium. The aforementioned semiconductors can be degenerately doped with either n-type or p-tpye material to produce barrier layers of the order of 50 A. thick. Where a p-type semiconductor is used, tunneling of electrons takes place from the conduction band of the semiconductor 4 to the electron-collecting metal tube. Where an n-type semiconductor is used, tunneling of electrons takes place from the conduction band of the semiconductor 4 to the metal 2.

Figure 7:
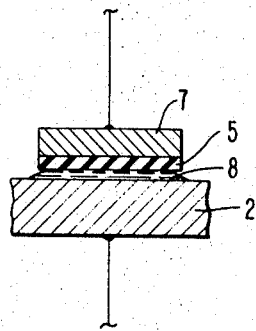
FIGS. 7–9 are various modifications of an electrode probe capable of use with the present invention.

While the doped semiconductor probe is believed to be particularly useful in achieving a practical and inexpensive molecular spectrometer, other probes can be used should technologies for their manufacture overcome present day difficulties. Since tunneling current through a barrier layer is not readily measurable with present known instruments if such barrier layer is too thick, it is required that such barrier layer be no greater than 100 A. Thus, as seen in FIG. 7, one can create a barrier layer by using an insulator 5 adjacent metal electrode 7 and sample 8, wherein the insulating layer 5 is of the order of 100 A. or less. In reality, such a probe is difficult to make because 100 A. of insulation would be subject to pinholes, leading to electrical shorts between metal layers 3 and 2. A polymer would be a representative insulator.

Figure 8:
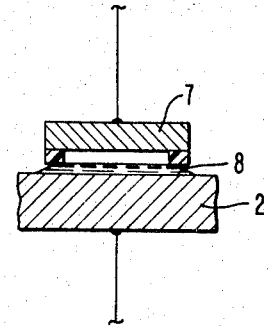

As shown in FIG. 8, a 100 A. space between electrodes 2 and 7 could be air or a vacuum, the latter serving as the barrier layer through which electrons can tunnel to interact with the molecular levels in the substance 8 under test.

Figure 9:
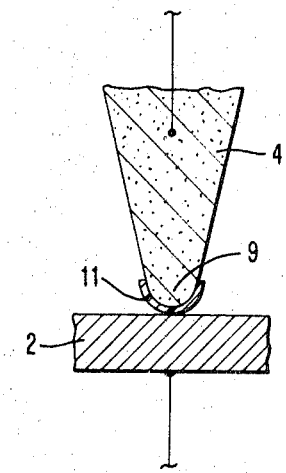

In FIG. 9, a metal tip 9 of probe 4 is anodized at the area 11, and the anodized tip is the barrier layer of interest. Other variations in making a barrier layer for my novel molecular spectrometer will appear to a person skilled in the art, but those variations will be chosen wherever possible, so that the resulting barrier layers are reliable, have long-life, and are not expensive to manufacture.

While most of the samplings have been observed near 10° K., and can be extended to 77° K., the present resolution of the spectrometer goes down as the temperature of sampling increases. However, there may be instances where readings at elevated temperatures are acceptable, thus not limiting the device to low temperature operation.

While the invention has been particularly shown and described with reference to a preferred embodiment thereof, it will be understood by those skilled in the art that various changes in form and details may be made therein without departing from the spirit and scope of the invention.

What is claimed is:
1. A molecular spectrometer comprising:
   a collector of electrons,
   a semiconductor electrode having a Schottsky barrier layer therein created by degenerately doping said semiconductor, said electrode and collector being electrically related so as to form a diode,
   a sample to be studied inserted between said electrode and collector,
   means for applying an A.C. modulating signal superimposed on a variable D.C. voltage across said diode, and
   means for sensing changes of conductance of said diode in response to said changes in voltage.

2. The molecular spectrometer of claim 1 wherein said degenerately doped semiconductor is GaAs doped with zinc.

3. The molecular spectrometer of claim 2 wherein the dopant zinc has a density of $2 \times 10^{19}$ carriers/cc.

References Cited

UNITED STATES PATENTS 3,469,184   9/1969   Lambe et al. _____ 324—65

OTHER REFERENCES

Conley, J. W. et al., Tunneling Spectroscopy in GaAs, in Physical Review, vol. 161, No. 3, Sept. 15, 1967, pp. 681–695.

Jaclevic, R. R. et al., Molecular Vibration Spectra by Electron Tunneling in Physical Review Letters, vol. 17, No. 22, Nov. 28, 1966, pp. 1139–1140.

Mead, C. A. et al., Fermi Level Position at Semiconductor Surfaces, in Physical Review Letters, vol. 10, No. 11, June 1, 1963, pp. 471–472.

Von Molnar, S., Point Tunneling Through a Schottky Barrier, in IBM Technical Disclosure Bulletin, vol. 10, No. 3, August 1967, pp. 330–331.

EDWARD E. KUBASIEWICZ, Primary Examiner

U.S. Cl. X.R.

307—323; 317/235